Jan. 30, 1951  F. A. BRANDES  2,539,807
METHOD OF FORMING ARTICLES
Filed Oct. 16, 1944  7 Sheets-Sheet 1

BY FRANK A. BRANDES
Kris Hudson Boughton & Williams
ATTORNEYS

Jan. 30, 1951  F. A. BRANDES  2,539,807
METHOD OF FORMING ARTICLES
Filed Oct. 16, 1944  7 Sheets-Sheet 2

INVENTOR.
FRANK A. BRANDES
BY
Kwis Hudson Boughton & Williams
ATTORNEYS

Jan. 30, 1951     F. A. BRANDES     2,539,807
METHOD OF FORMING ARTICLES
Filed Oct. 16, 1944     7 Sheets-Sheet 3

INVENTOR.
FRANK A. BRANDES
BY Kwis Hudson Boughton & Williams
ATTORNEYS

Patented Jan. 30, 1951

2,539,807

UNITED STATES PATENT OFFICE 2,539,807

METHOD OF FORMING ARTICLES

Frank A. Brandes, Shaker Heights, Ohio, assignor to Automatic Die & Products Company, Cleveland, Ohio, a corporation of Ohio Application October 16, 1944, Serial No. 558,863

1 Claim. (Cl. 29—1.3)

The present invention relates to a method for making relatively thin walled tubular metal articles having a comparatively thick closed end or base from metal blanks, the thickness of which blanks is greater than that of the walls of the finished articles but less than that of the bases of the finished articles. More particularly, the invention relates to a method of making cartridge or shell cases from metal blanks, preferably brass or steel, the thickness of which blanks is greater than that of the finished cases but less than that of the closed end of the cases.

The principal object of the present invention is the provision of a novel and improved method of making a comparatively thin walled tubular metal article having a relatively thick closed base at one end, more especially a cartridge or shell case, from a metal blank, preferably steel, the thickness of which blank is greater than the thickness of the walls and less than the thickness of the base of the finished article or case, by a plurality of successive dieing operations at least a portion of which employ dies and punches of progressively smaller diameter and at least some of which are so constructed that the base of the blank formed by initial operations is reduced or contracted radially in subsequent operations in such a manner as to increase the thickness thereof.

Another object of the invention is the provision of a novel and improved method of making comparatively thin walled tubular metal articles having a relatively thick closed base at one end, and more especially cartridge or shell cases, by a continuous step-by-step process from strip metal, preferably steel, the thickness of which strip metal is greater than the thickness of the walls and less than the thickness of the base of the finished article or case, by a plurality of successive dieing operations, at least a portion of which employ dies and punches of progressively smaller diameter and at least some of which are so constructed that the base of the blank formed by initial operations is reduced or contracted radially in subsequent operations in a manner to increase the thickness thereof.

The present application is a continuation-in-part of my copending application Serial No. 445,708, filed June 4, 1942, now abandoned, and further objects and advantages of the invention will be apparent to those skilled in the art to which the invention relates from the following description of the preferred embodiment thereof described with reference to the accompanying drawings forming a part of this specification in which similar reference characters designate corresponding parts, and in which

Figs. 7a and 7b together form a fragmentary sectional view approximately on the line 7—7 of Figs. 6a and 6b;

Fig. 8 is an enlarged view of a portion of Fig. 7a; and

As previously stated, the invention is especially adapted for making cartridge or shell cases from strip metal and is herein illustrated and described as applied to making steel shell cases for 40 mm. shells. The press shown in the drawings is similar to that disclosed and claimed in my U. S. Patent No. 2,310,890, issued February 9, 1943, and will not be herein described in detail. Suffice it to say that the strip A from which the shell cases are formed in step fed between the die and punch assemblies B and C, respectively, by roller feed mechanism, designated generally by the reference characters D and E, located adjacent to the entrance and exit ends of the machine, respectively, and actuated to feed the strip in timed relation to the movement of the upper crosshead F which carries the punch assembly C. The roller feed mechanisms are connected together by a drive G and to the main crankshaft of the press by mechanism H similar to that shown in the aforesaid patent.

Generally speaking, the press shown comprises a rectangularly-shaped frame J, the upper part of which forms a supporting surface or table 10 adapted to support the die assembly B, and the upper cross-head F is reciprocable towards and from the table 10 by draw rods or bars 11 connected to the cross-head F adjacent to the corners thereof and to a lower cross-head located within the frame J near the base of the machine. The draw rods project through the table and, together with the upper and lower cross-heads, form a cross-head assembly, which assembly is adapted to be reciprocated vertically by a crankshaft operatively connected to the lower cross-head by an adjustable connecting rod or pitman.

Figure 1:
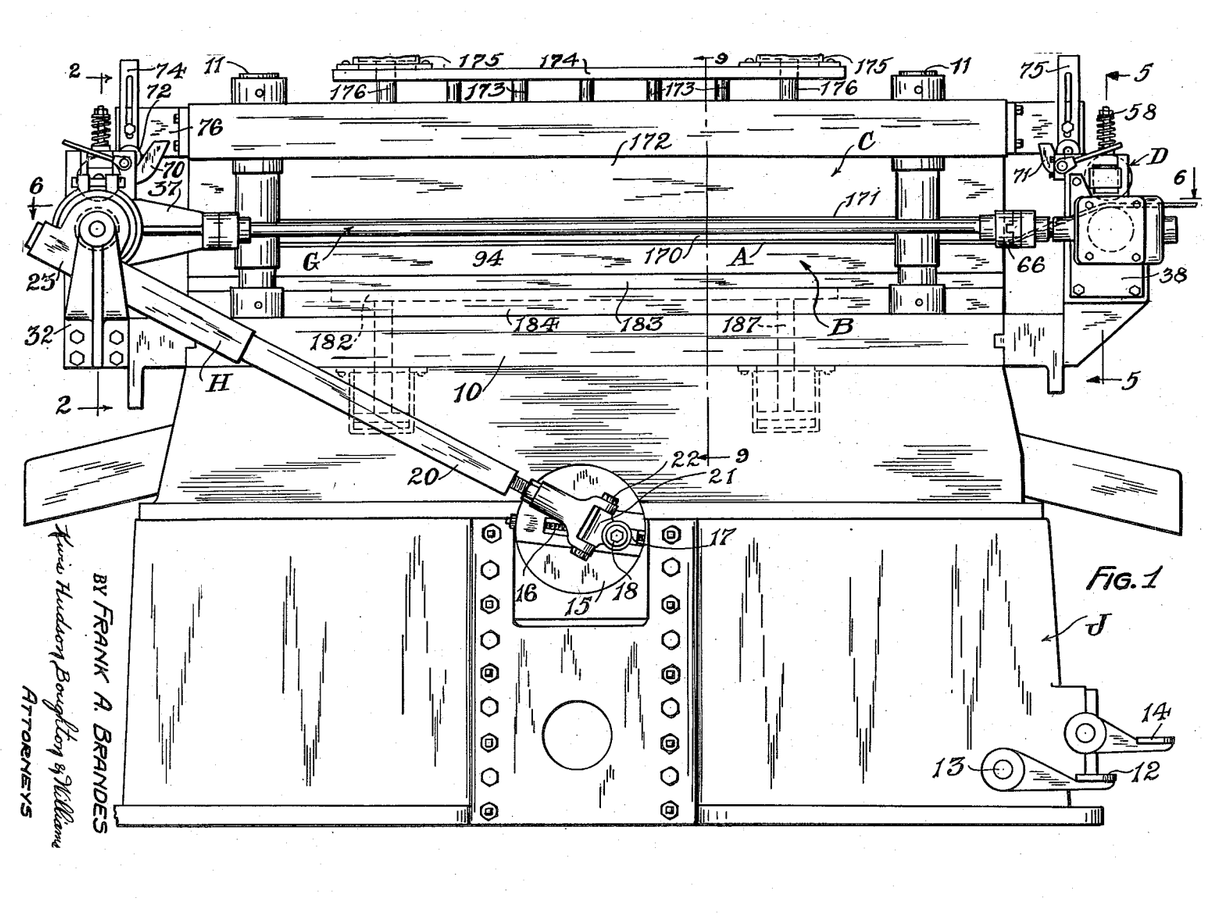
Fig. 1 is a side elevational view of a press for practicing the present invention.
Figure 2:
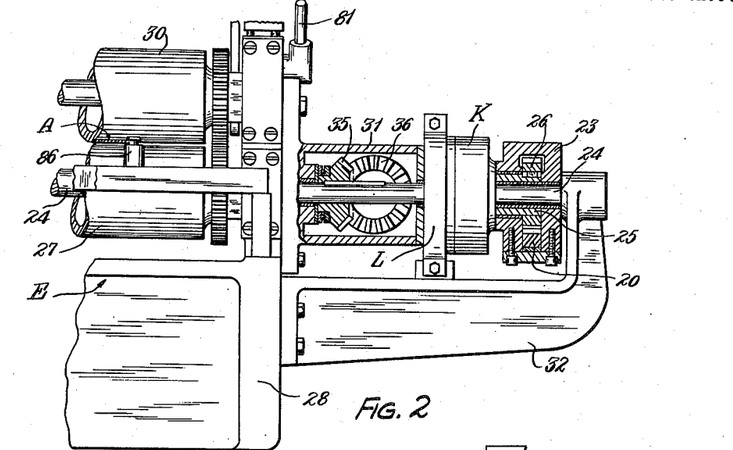
Fig. 2 is a fragmentary elevational view of a portion of the left-hand end of the press, with parts in section approximately on the line 2—2, Fig. 1.

The crankshaft passes horizontally through the frame J below the table 10 and above the lower cross-head and is supported in the frame by suitable bearings which engage portions of the concentric part or parts of the crankshaft. The rear end of the crankshaft, as the machine is viewed in Fig. 1 is provided with a flywheel and driven pulley rotatably supported thereon but adapted to be connected thereto by a clutch of conventional construction actuated by a pedal 12 fixed to a horizontal shaft 13 rotatably supported in the frame J and operatively connected to the clutch by suitable linkage mechanism. A brake connected to the crankshaft behind the clutch is operatively connected to the clutch actuating mechanism in such a manner that at all times when the clutch is disengaged the brake is applied.

The clutch, brake and operating mechanism referred to may be of any well-known construction and are not described in detail. Suffice it to say that the clutch and brake cooperate to automatically cause the crankshaft to make one complete revolution and the press one complete operation each time the pedal 12 is depressed. If the pedal is held down the press will continue to operate automatically until the pedal is released. The press always stops with the cross-head assembly in its upper position. The driven pulley is continuously rotated during operation of the press from some convenient power source, such as an electric motor. The second pedal 14 provides convenient means for releasing mechanism used to hold the pedal 12 in depressed position without attention on the part of the operator.

The front end of the crankshaft, as viewed in Fig. 1, has fixed thereto a member 15 provided with a groove in its outer side within which groove a lead screw 16 rotatably carried thereby is located with its longitudinal centerline intersecting the axis of rotation of the crankshaft. The left-hand end of the lead screw 16, as viewed in Fig. 1, is rotatably fixed in a suitable aperture in the end wall of the member 15 and is provided with a hex head for facilitating rotation thereof. The member 15 also carries a member 17 slidably supported in the groove within which the lead screw 16 is located and which member is in threaded engagement with the lead screw 16 and is adapted to be moved radially of the axis of rotation of the crankshaft upon rotation of the lead screw. The member 17 has a forwardly projecting crankpin 18 formed integral therewith, which crankpin is operatively connected to a link 20 by a member 21 rotatably secured to the crankpin and pivotally connected to the lower end of the link by a bolt 22.

The upper end of the link, which is rectangular in shape, is slidably supported in a bracket or member 23 rotatably supported on a shaft 24 and a member 25 also rotatably supported on the shaft 24, and has rack teeth cut in the upper side thereof, which teeth are continuously in mesh with a gear 26 keyed to the member 25. The member 25 is the driving member of a one-way driving clutch K, the driven member of which is keyed to the shaft 24. The clutch K may be of any conventional construction so long as it functions to intermittently rotate the shaft 24 in a counterclockwise direction, as viewed in Fig. 1, upon reciprocation of the link 20. A spring-pressed brake L maintains a constant drag on the shaft 24 so as to prevent over-feeding. The shaft 24 which projects to the rear of the press extends through the center of the lower exit feed roll 27 and is rotatably supported at opposite ends of the roll 27 in a frame 28 which carries the exit feed rolls 27 and 30, in a housing 31 bolted to the front wall of the frame 28, and in the outer or forward end of a bracket arm 32 bolted to the front face or wall of the frame 28. The construction of the exit feed roll assembly, including the rolls 27, 30 and the bracket 28, etc., is not shown and described in detail since it is the same as the entrance feed roll assembly included in the rolls 33, 34, which latter assembly is shown in detail in the drawings and hereinafter specifically described.

The shaft 24 has a bevel gear 35 keyed thereto, which bevel gear is continuously in mesh with a bevel gear 36 fixed to the left-hand end of a short shaft forming a part of the drive G, which shaft is rotatably supported in a projection 37 on the housing 31. The opposite end of the drive G comprises a similar short shaft rotatably supported in a housing 38 bolted to the front face or wall of the frame 40 of the entrance feed roll assembly and provided with a bevel gear 41 continuously in mesh with a bevel gear 42 carried by a shaft 43 extending through the lower roll 33 of the entrance feed rolls. The shaft 43 is rotatably supported in suitable bearing assemblies detachably and slidably secured in aligned rectangular apertures in the side members of the frame 40 by cover plates 46 bolted to the frame. The roll 33 is keyed to the shaft 43.

Figure 5:
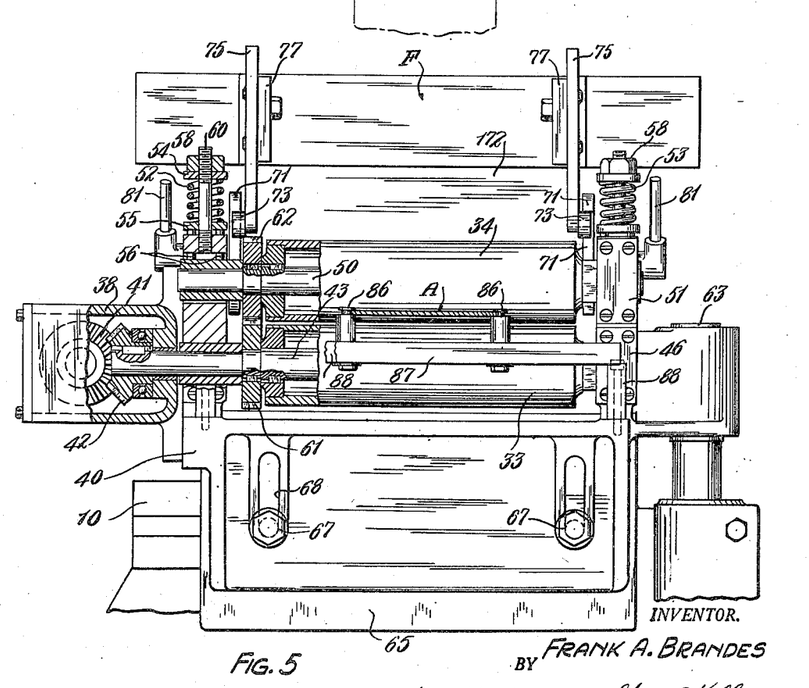
Fig. 5 is a fragmentary elevational view of a portion of the right-hand end of the press, with parts in section, approximately on the line 5—5, Fig. 1.

The upper feed roller 34 is keyed to a shaft 50 rotatably supported in suitable bearing assemblies slidably supported for vertical movement in alignment rectangular apertures in the frame 40. The bearing assemblies for the top roll 34 are held in position by cover plates 51 bolted to the frame 40. The shaft 50 and in turn, the upper roll 34 is continuously urged in a downward direction by compression springs 52, 53 interposed between washers 54 and plates 55, respectively. The undersides of each of the plates 55 press against four rods 56 slidably supported in the frame 40 and so located as to engage the plates adjacent to the corners thereof. The lower ends of the rods 56, press against the bearing members for the shaft 50. Upward movement of the washers 54 is prevented by nuts 58 threaded on the upper ends of studs 60 projecting upwardly from the top of the frame 40. The nuts 58 provide means for adjusting the springs 52, 53. The shafts 43, 50 are operatively connected together by gears 61, 62 keyed thereto and located immediately to the left of the rolls, as viewed in Fig. 5. The teeth of the gears 61, 62 are long enough to remain in mesh even though the rollers are separated by material passing therebetween.

The frame 40 is rotatably supported by a vertical shaft 63 fixed in a boss 64 formed integral with a member 65 interposed between the frame J of the press and the frame 40 of the entrance feed roll assembly and secured to the frame in a suitable manner. The construction is such that the drive G can be separated at the coupling 66 and the feed roll assembly swung out of operative position when setting up the tools, etc. When the feed roll assembly is in operative position, the frame 40 is secured to the member 65 by bolts 67 projecting through vertically elongated slots 68 in the frame 40. The boss 64 includes means for adjusting the frame 40 vertically.

As previously stated, both the entrance and exit feed roll assemblies are similar in construction and operate to intermittently feed strip material through the press upon each reciprocation of the link 20 in one direction. The feeding operation takes place while the press is open. During the working operation or preferably just as the rolls are through feeding, the rolls are preferably separated so as to permit free movement of material being operated upon. This leaves the material free to be governed by the pilots on the tools, etc., and prevents damage to the material which might otherwise be torn. As shown, provision is made for lifting the top rolls in the form of bell crank levers 70, 71 pivotally carried by the frames 28, 40, respectively adjacent to opposite ends of the top feed rolls 30, 34 in such a manner that they are actuated by rollers 72, 73 carried by members 74, 75 adjustably fixed to brackets 76, 77, respectively, carried by the upper cross-head F. The bell crank levers are identical in construction and operation and only one of the bell crank levers is shown and described in detail.

Figure 3:
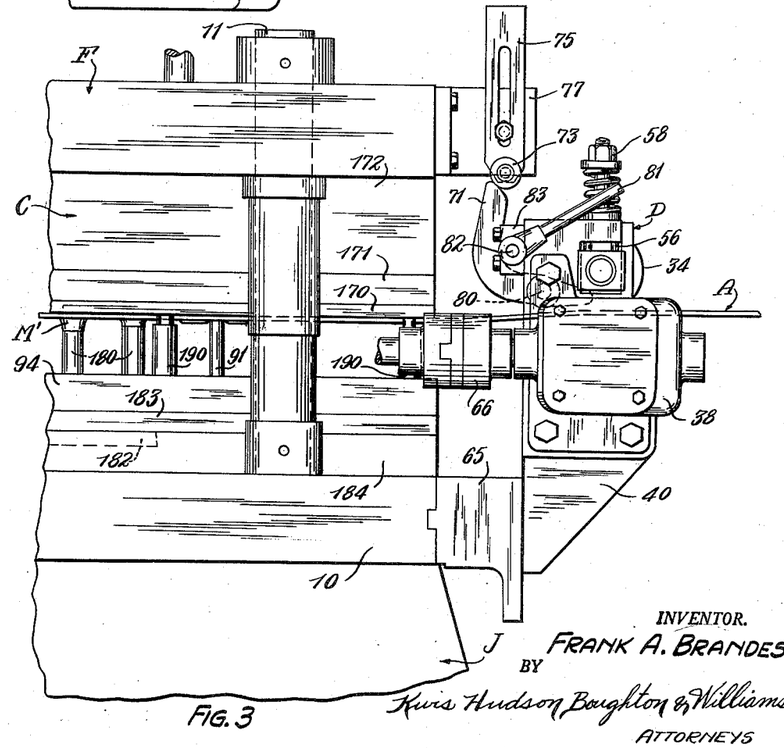
Fig. 3 is a fragmentary enlarged elevational view of a portion of Fig. 1, with the press partly closed.

The horizontal arm, see Fig. 3, of the bell crank lever 71 is rotatably supported by a pin 80 fixed to one side of the frame 40 and the right-hand end thereof projects underneath the front bearing assembly for the shaft 50. The other or vertical arm extends upwardly into a position to be engaged by the near roller 73 and has its upper end inclined so as to cooperate with the roller 73 to rock the lever 71 about its pivot 80 in a counterclockwise direction to lift the roll 34 away from the roll 33 upon each reciprocation of the cross-head F.

Figure 4:
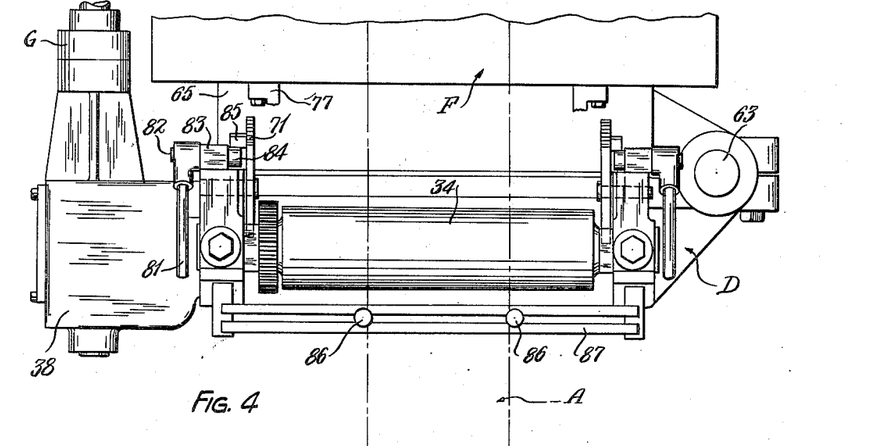
Fig. 4 is a plan view of the entrance feed roll assembly.

The preferred construction shown also includes manual means in the form of levers 81 for lifting the top feed rolls. Referring particularly to Figs. 3 and 4, the front lever 81 is connected to the left-hand or front end of a shaft 82, rotatably supported in a member 83 fixed to the rear of the frame 40. The other end of the shaft 82 is provided with a cam member 84 adapted to engage a member 85 welded to the vertical arm of the bell crank lever 71. The construction is such that rotation of the lever or levers 81 in a counterclockwise direction, as viewed in Fig. 3, causes the cam members 84 to rotate the bell crank levers 71 in a direction to lift the upper roll 34. The strip A is guided into and out of the feed rolls by a plurality of members 86 having grooves in their upper ends within which the edges of the strip A slidably engage. The members 86 are adjustably carried by a plurality of parallel rods 87, 88 connected to members 89 bolted to the frames 28, 40 of the feed roll mechanisms.

From the foregoing it will be apparent that upon each reciprocation of the cross-head F, the strip of material A will be fed through the press a predetermined amount. As the strip A which, in the present instance, is ⅜" thick, is fed through the machine, the first operation performed thereon by the punch and die assemblies is that of punching the pilot holes 90 which, during subsequent operations, are engaged by pilot members 91 to properly locate the strip. Referring to the embodiment shown, the pilot holes are produced at intervals of 7¼ inches by punches 92 which cooperate with die cavities 93 in the die 94 and, during subsequent operations, locate the sheet material and prevent shifting thereof during the dieing operations.

Either as a part of the operation of forming the pilot holes 90 or subsequently thereto, the strip A is provided with two oppositely facing, semi-circular slots or slits 95, the ends of which do not quite join, thus leaving the blank M connected to the strip A by narrow pieces of metal 96. The strip is then advanced another step and slit or slotted again in a similar manner except for the fact that in this instance the slits 97 are inside of the slits 95 and are turned 90° with respect to the latter. The blank M is now connected to the strip by narrow pieces of metal 98, 98 which cause the blank M to be carried along by the strip from station to station but leave the edges of the blank free to be drawn inward during the dieing operations, thus preventing crinkling and disalignment of the strip. The slits 95, 97 are formed by punches 100, 101, respectively, which cooperate with suitable die cavities 102, 103 in the die 94. As the press opens, the blanks M are pushed out of the cavities 102, 103 by spring pressed knockouts 104, 105, respectively.

Figure 6A:
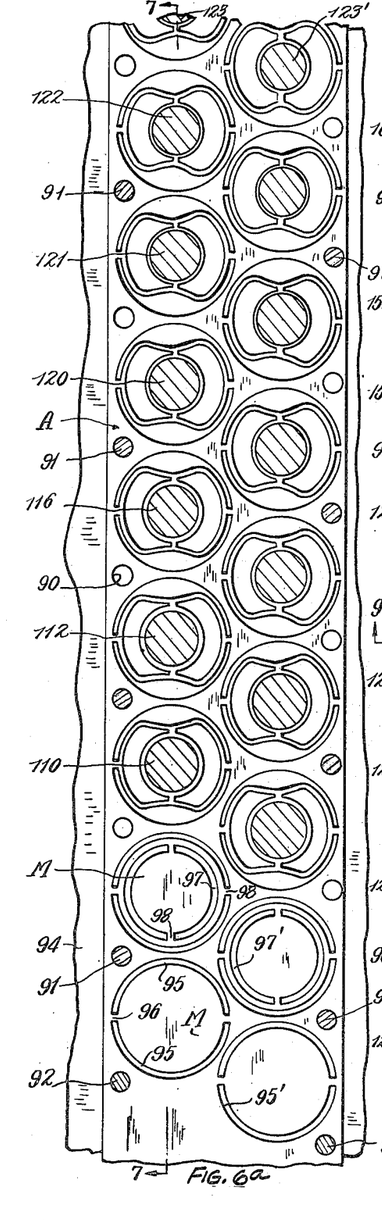
Figs. 6a and 6b together form a fragmentary sectional view approximately on the line 6—6 of Fig. 1.
Figure 6B:
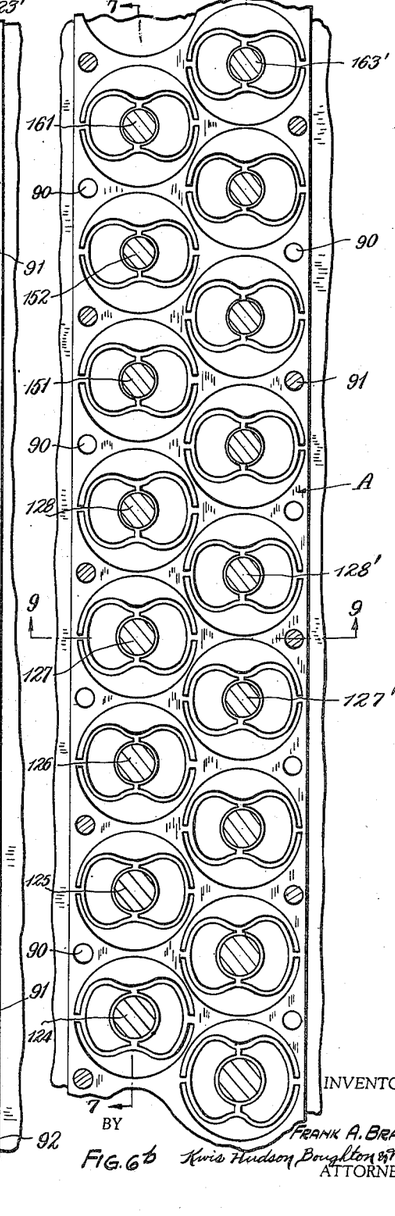
Figure 7A:
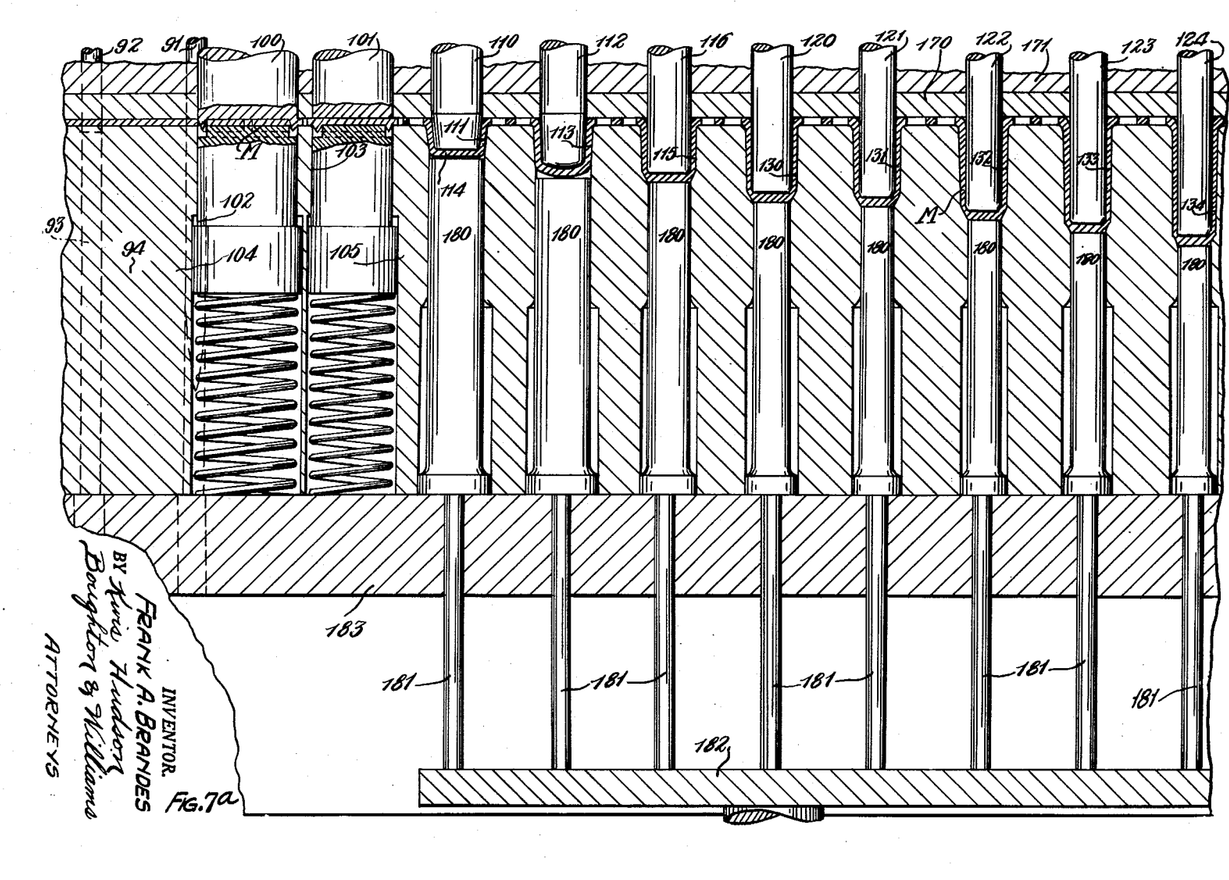
Figures 7B, 8:
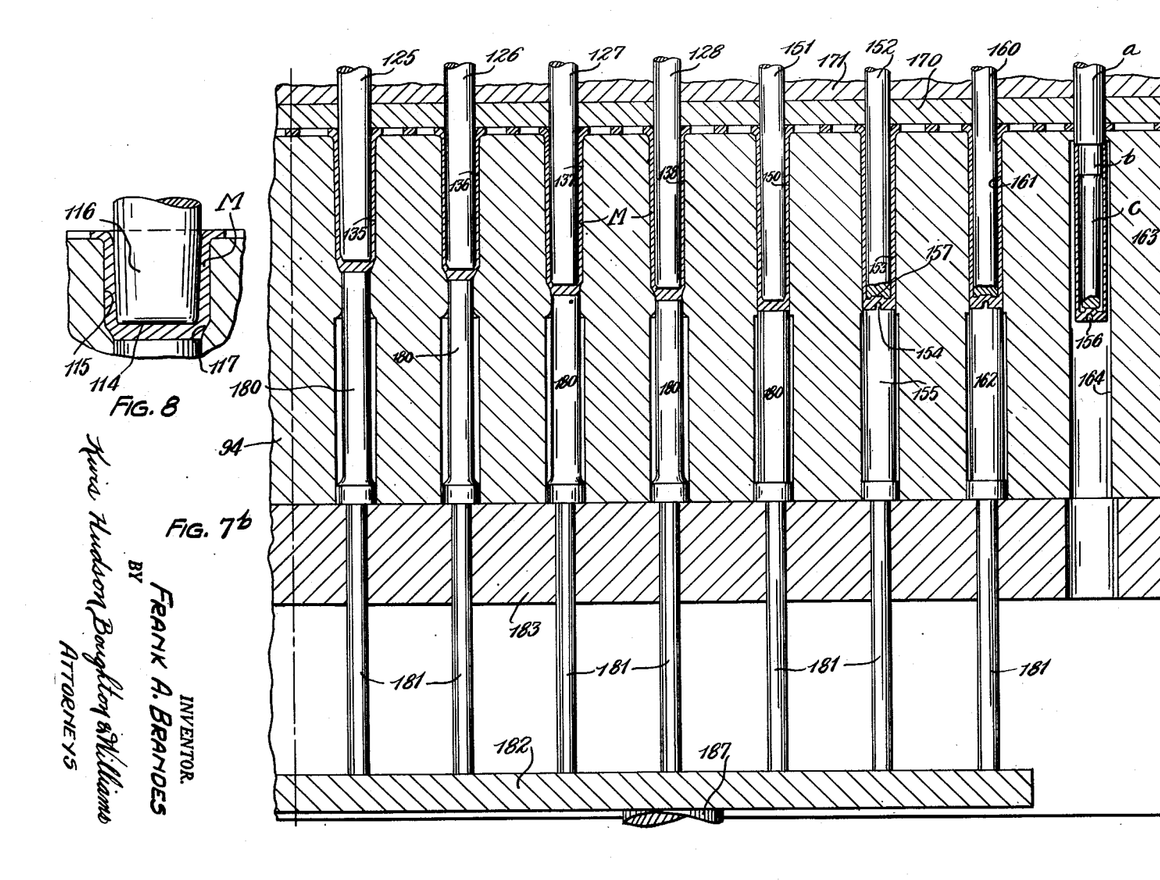
Figure 9:
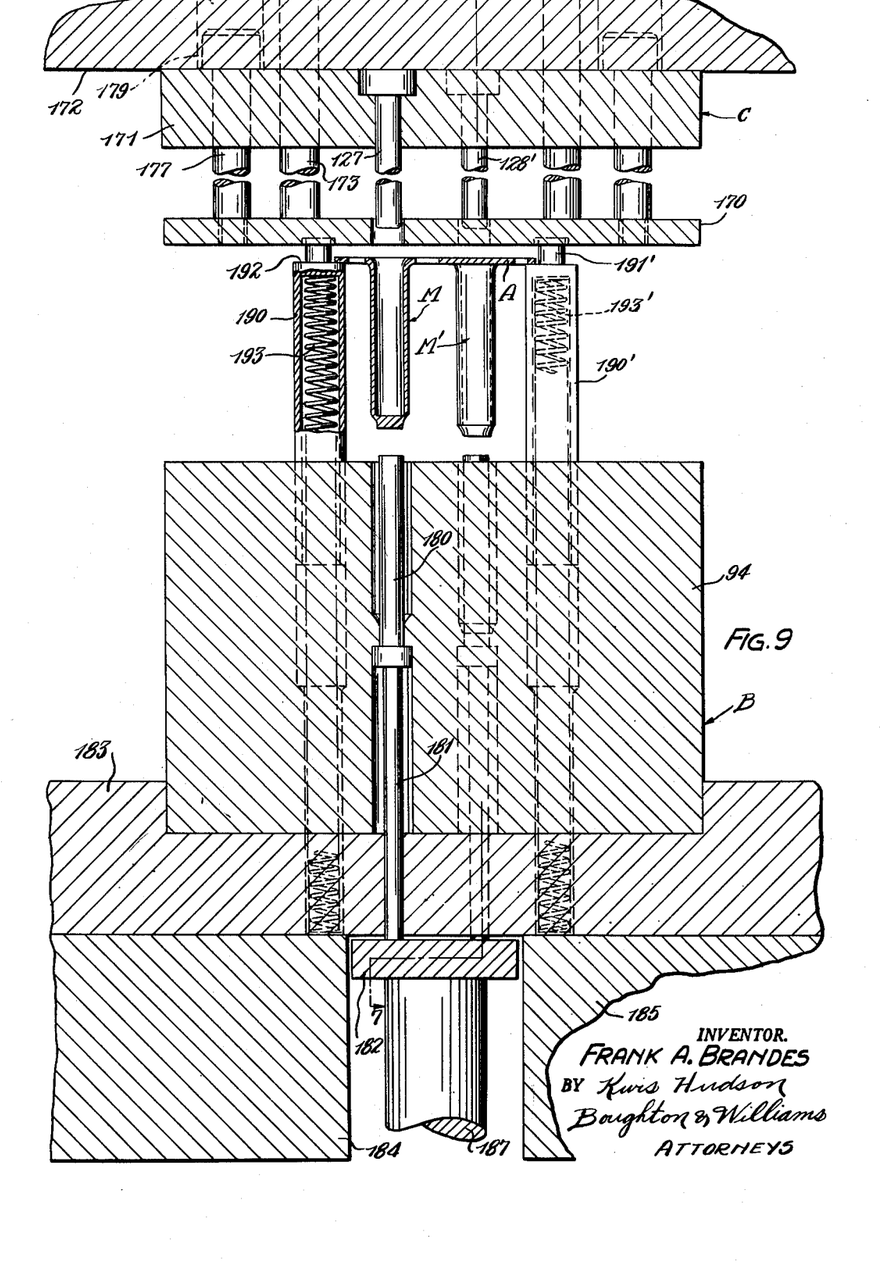
Fig. 9 is a sectional view approximately on the line 9—9, Fig. 6b.

In the preferred embodiment of the invention shown, two rows of shell cases are formed simultaneously, therefore, the operations just described, which are formed on the front part of the strip A, as viewed in Fig. 1, are duplicated along the rear portion of the strip, and the corresponding parts are designated by the same reference characters with a prime mark added thereto. The same applies to the subsequent dieing and other operations hereinafter described. It is also to be understood that any number of rows of articles or shell cases may be simultaneously formed. One of the advantages of mulitple row operation resides in the fact that considerable material can be saved since the blanks can be nested or overlapped as shown in Figs. 6a, 6b. As viewed in Figs. 6a, 6b, the slots 95 and 97 appear to be stamped-out portions.

In forming the particular shell case mentioned above, thirteen drawing, one coining, one stenciling and one trimming operations are employed. However, it is to be understood that more or less drawing operations may be employed depending upon the form of the article being produced and the properties of the material being used, and the coining and stenciling operations may be omitted, as desired. Subsequently to forming the slits 95 and 97 as described above, which slits partially detach the blank M from the strip A, the first drawing step is performed by a punch 110 in cooperation with a cylindrical die cavity 111. The diameters of the punch and die cavity 110, 111, respectively, are considerably greater than the diameter of the finished shell case and, in this operation, the blank is merely formed into a cup shape. In the second drawing operation performed by the punch 112 in cooperation with the die cavity 113, which punch and die cavity are slightly smaller in diameter than the punch and die cavity 110, 111, respectively, the blank is elongated and reduced in diameter or drawn further than by the first drawing operation.

In view of the fact that the thickness of the strip A is less than that of the base of the finished shell case, during the dieing operations subsequently to be described, the material which forms the closed end 114 of the blank M and what may be considered the wall adjacent thereto, is compressed radially inwardly, and upwardly to some extent, thus reducing the diameter of the closed end of the blank and increasing the thickness thereof. To accomplish this result the die cavity 115, in which the third draw is performed in cooperation with the punch 116, is of reduced diameter at or immediately below the lower point of travel of the punch 116, the reduction being in the form of a reverse curve 117 as distinguished from an abrupt shoulder, etc. The material of the blank M acted upon by or confined between the reverse curve 117 and the lower outer edge of the punch 116, which edge is rounded, is cold-forged or die swaged, so to speak, and forced into the lower closed end 114 of the blank, thus increasing the thickness thereof. The diameter of the die cavity 115 is less than the diameter of the die cavity 113, from which it follows that this operation further draws the blank and reduces its wall thickness in addition to increasing the thickness of the base or closed end.

The subsequent nine drawing operations are similar to the third drawing operation just described and progressively increase the thickness of the bottom or closed end of the cup section of the blank, and decrease the wall thickness of the blank, elongating the same. As the subsequent drawing operations are all substantially the same as the operation just described, they will not be referred to in detail. Suffice it to say that these operations are performed by punches 120, 121, 122, 123, 124, 125, 126, 127, and 128 in cooperation with the die cavities 130, 131, 132, 133, 134, 135, 136, 137 and 138, respectively. In each instance the die cavity at or adjacent to the lower travel of the corresponding punch is restricted slightly by a rounded shoulder, which shoulder in cooperation with the lower end of the punch forges, die swages or otherwise causes the metal of the closed end of the blank to be moved radially inwardly, thus reducing the diameter thereof and increasing its thickness.

In the following operation, the die cavity 150 is cylindrical and in cooperation with the punch 151 performs the last drawing operation on the blank. Upon the next reciprocation of the upper cross-head F, a punch 152 in cooperation with a die cavity 153 and a projection 154 on the top of the knockout 155 performs a coining operation on the closed end of the blank, which coining operation in the present instance forms the primer cavity 156 of the shell case and a slightly raised projection 157 inside of the case in axial alignment with the primer cavity. As shown, the next step is a stenciling operation performed by the punch 160 in cooperation with the die cavity 161 and the knockout 162. It will be readily apparent that either or both the coining operation and the stenciling operation may be omitted depending upon the particular article being formed. The completed shell case is then trimmed to free it from the strip A in a last operation performed by a punch 163 in cooperation with a cavity 164.

The trimming punch 163 and the cavity 164 with which it cooperates, may be of any conventional design. As shown, the punch 163 has three sections of different design, designated a, b and c in the drawings, and the die cavity 164 is counterbored from the lower end. The section a of the punch 163 trims the blank M from the strip A. The diameter of the section b is equal to the internal diameter of the blank M while the lower section c is of less diameter than the internal diameter of the blank. After the blank has been trimmed from the strip and forced through the main or upper portion of the die cavity, it adheres to the section b of the punch and the punch is retracted. After the upper end of the blank has been forced through the main portion of the die cavity, the resiliency of the material tends to increase the over-all diameter thereof slightly and when the punch is withdrawn from the die cavity, the finished blank is stripped from the section b of the punch by the shoulder formed by the counterbore, thereupon, the blank drops through the counterbore into a suitable receptacle.

While the sequence of operations about to be described may vary somewhat depending upon how hard the punches stick in the blanks and the blanks in the die cavity, the pressure existing at any particular time in the supply line to the air actuated motors hereafter referred to, etc., in general, when the press begins to open, the stripper plate 170 remains stationary or lags behind the movement of the cross-head F, with the result that the punches are withdrawn from the blanks as they are carried away from the stripper plate by the punch holder 171 fixed to the top die shoe 172 which, in turn, is connected to the upper cross-head F. The stripper plate 170 is continuously urged in a downward direction, that is, in a direction away from the punch holder 171 by a plurality of rods 173 interposed between the upper surface of the stripper plate and the lower surface of a plate 174 located above the cross-head F. The rods 173 extend through suitable apertures in the punch holder, the top die shoe and the cross-head F. The plate 174 is continuously urged in a downward direction or towards the cross-head F by a plurality of fluid pressure motors 175, the cylinders of which are connected to the plate 174 while the piston rods 176 thereof are connected to the cross-head F. The lower ends of the cylinders of the fluid pressure motors 175 are continuously connected to a constant source of fluid pressure. Movement of the stripper plate 170 away from the punch holder 171 is limited by a plurality of bolts 177, the heads of which are located in enlarged apertures 178 in the top die shoe while the lower ends thereof are fixed to the stripper plate 170. The engagement of the heads of the bolts 177 with the upper side of the punch holder 171 limits the movement of the bolts and, in turn, the stripper plate in a downward direction.

Simultaneously with the initiation of the upward movement of the cross-head F, the blanks M are pushed out of the die cavities by a plurality of knockouts 180, similar to the knockouts 155 and 162 previously referred to, except for the fact that the upper ends thereof are smooth. The knockouts are slidably supported in apertures in the die 94 which apertures are a continuation of the die cavities and, as shown, are counterbored from the lower side of the die to accommodate enlarged heads formed on the lower ends of the knockouts. The knockouts 180 are raised by knockout rods 181 interposed between the lower ends thereof and the upper surface of a knockout bar 182 extending longitudinally of the die and located underneath the bottom die shoe 183 between the parallels 184, 185 interposed between the die shoe 183 and the top 10 of the frame of the press. The knockout rods 181 are slidably supported in suitable apertures in the bottom die shoe 183 and are of less diameter than the heads of the knockouts, with the result that movement of the knockouts in a downward direction is limited by the engagement of the heads thereof with the upper surface of the lower die shoe 183. The knockout bar 182 is adapted to be raised in timed relation to the opening of the press by a plurality of double-acting fluid pressure actuated motors 186 located within the frame of the press, with the piston rods 187 thereof projecting upward through the top 10 and engaging the underside of the knockout bar 182. The motors 186 may be secured to the frame of the press in any convenient manner and the flow of fluid pressure to and from the same is preferably controlled by one or more solenoid valves actuated by mechanism connected to the crankshaft of the press.

When the press is open, the strip of material being operated upon is supported on or carried by a plurality of members 190 slidably supported in suitable apertures in the upper surface of the die 94, the upper ends 191 of which members are of reduced diameter thus forming shoulders 192 upon which the edges of the strip A rest. The members 190 are counterbored from their lower ends and are continuously urged in an upward direction by compression springs 193 interposed between the closed ends thereof and the parallels 184 and 185. Movement of the members 190 in an upward direction is limited by the engagement of the reduced upper ends 191 thereof against the underside of the stripper plate 170. When the press is open, the feed rolls are actuated, as previously described, to advance the blanks to a position immediately above the next die cavity.

From the foregoing disclosure it will be apparent that two finished articles are discharged from the press upon each reciprocation of the crosshead F and that eighteen operations in addition to the formation of the pilot holes 90 are employed in the formation of each article. In view of the easy stages in which the articles are formed, it is unnecessary to anneal the material between the various operations. The lower restricted ends of the die cavities are smooth and when the blanks are compressed therein by the punches, the closed ends of the blanks are contracted so as to build up the material thereof in thickness without the formation of corrugations, wrinkles, etc. The action is somewhat analogous to cold forging or upsetting. The metal or material of the closed end of the blank is caused to flow toward the center and build up the thickness of the end of the blank.

In the embodiment shown, the blanks are formed from the strip by two pairs of oppositely facing, semi-circular slots or slits. It will be understood that more or less slots or slits may be employed as desired, depending upon the thickness and physical characteristics of the materials, the size of the blank, etc. Attention is called to the fact that the end of the punch 112 is slightly rounded which construction stretches the bottom of the blank slightly. In the next operation, the bottom of the blank is struck up again. This operation can be repeated between the subsequent dieing operations disclosed, if desired.

The preferred embodiment of the invention has been shown and described in considerable detail, however, it is to be understood that the invention is not limited to practice by the particular apparatus shown and it is my intention to herein cover all adaptations, modifications, and uses thereof which come within the practice of those skilled in the art to which the invention relates and within the spirit and scope of the appended claim.

Having thus described my invention, what I claim is:

The method of making a tubular metal article having a comparatively thin side wall and a relatively thick base which method comprises providing a generally disk-shaped metal blank the thickness of which blank is greater than the thickness of the side wall of the finished article and less than the thickness of the base of the finished article, drawing said blank to a substantially cup-shaped form the side and end walls of which are substantially the same thickness and have smooth interior and exterior surfaces substantially free of indentations or projections, and then subjecting said cup-shaped blank to successive drawing operations and substantially simultaneously with the completion of each drawing operation subjecting said base to radial compression to forge thicken the periphery of the base and to flow a portion of the metal of said thickened periphery towards the center of the base to provide an even thickness in said base, the said thickening being of a degree that subsequent flowing can be accomplished without lapping of the metal, whereby said base at the end of said drawing operations is composed in its entirety of homogeneous forged metal without laps or seams.

FRANK A. BRANDES.

REFERENCES CITED

The following references are of record in the file of this patent:

UNITED STATES PATENTS

| Number | Name | Date |
| --- | --- | --- |
| 159,883 | Bayliss | Feb. 16, 1875 |
| 311,430 | Howard | Jan. 27, 1885 |
| 1,318,860 | Fries et al. | Oct. 14, 1919 |
| 2,150,708 | Andrews | Mar. 14, 1939 |
| 2,309,942 | Ekstedt et al. | Feb. 2, 1943 |